Sept. 22, 1964  M. W. WOLFE  3,149,658
TIRE SPLICE

Filed Aug. 30, 1961  2 Sheets-Sheet 1

INVENTOR.
MERRITT W. WOLFE
BY
J.B. Holden
ATTORNEY

Sept. 22, 1964        M. W. WOLFE        3,149,658
TIRE SPLICE

Filed Aug. 30, 1961        2 Sheets-Sheet 2

INVENTOR.
MERRITT W. WOLFE
BY
*J. B. Holden*
ATTORNEY

3,149,658
TIRE SPLICE
Merritt W. Wolfe, Akron, Ohio, assignor to The Goodyear Tire & Rubber Company, Akron, Ohio, a corporation of Ohio
Filed Aug. 30, 1961, Ser. No. 134,961
12 Claims. (Cl. 152—330)

This invention relates to tires and the like, the rubber cover of which is spliced with a rubber bonding material which contains short discrete, discontinuous lengths of filamentary material. The filamentary material assists in holding the portions of the tire together before curing, and provides resistance to the separation or opening of the different rubber portions of the tire while in service.

The reinforced splice strips can be used in one or more of several ways. They may be used (1) in splicing the ends of a new tread or a retread, (2) in splicing the ends of the side piece, and (3) in splicing a new tread or a retread to each side piece. Such splices are mentioned as illustrative, and it is to be understood that the splices may be used in bonding other rubber portions to one another.

The splicing of tires, and particularly the larger tires, has presented serious problems. For instance, at the present time, synthetic rubber is seldom used in a splice in the tread of an earthmover tire because of the tendency of such splices to open. By reinforcing the splices with short lengths of filamentary material as herein contemplated, while the tire is in the mold during curing, stronger splices are obtained, and it is possible to use synthetic rubbers which have less bonding properties than the rubbers now used. Also better bonds are obtained with the synthetic rubber in the tires, as where a synthetic tread center is used with natural rubber side pieces. The reinforced splices of this invention give good bonds in such structures.

The filamentary material may, for example, be wire, nylon or polyester monofilament, yarn or flock or it may be cotton cord. Short lengths of wire are advantageously used in earthmover tires and the like in preventing a splice from being snagged or pulled open when used on very rugged terrain, as in rock cutting applications. However, for most applications a more flexible material will be preferred. Any material sufficiently flexible for any particular service can be used. The short lengths may, for example, be ¼ to 1¼ inches long. Usually pieces about ¾ inch long are preferred. For intricate tread designs, short pieces are required to conform to the tread surface. Longer pieces provide greater tensile strength, and can be used with large and open lug designs such as formed in the treads of earthmover tires, for example.

The filamentary material is compounded with unvulcanized rubber, and the rubber elements spliced together. For a tread splice, all-rubber tread-stock gum strip can be used; for splicing a side piece to a tread center piece in a large tire, for instance, all-rubber gum strip can be used. A gum stock can be used in all instances, and will ordinarily be used for all splices in factory operations. However, it is to be understood that the filamentary material can be blended with various rubber stocks. The addition of short lengths of filamentary material to the gum strip currently used, particularly if the filamentary material be oriented in the direction in which high tensile strength is desired, gives better splice reinforcement both before and after the splice is cured.

The amount of the filamentary material used may vary from two to twenty parts per 100 parts of rubber employed. For passenger tires, narrow light gauge strips containing less filamentary reinforcement will be used. Wider strips with heavy reinforcement will be used in splices on earthmover tires. Intermediate reinforcement will be used on truck tires, for example. Thus the nature and amount of reinforcement will vary, as requirements vary.

The invention is further explained in connection with the accompanying drawings in which—

FIGURES 1 to 4 are different views of the same tire 5. It may be a passenger tire. For purposes of illustration it is supposed that the splice 6 is composed of pieces of nylon shreds or flock, each about ¼ to 1 inch long, and preferably about ¾ inch long. The diameter of the shredded material may vary from about .015 to .030 inch in diameter. The stock contained about five pounds of nylon for each 100 pounds of rubber. The stock may be calendered and cut into strips of any desired size. For passenger tires these may be ¾ inch wide. They may be 1 to 1½ inch wide for splicing truck tires. For earthmover tires they may be 1½ to as much as 3 inches or more in width.

Figure 4:
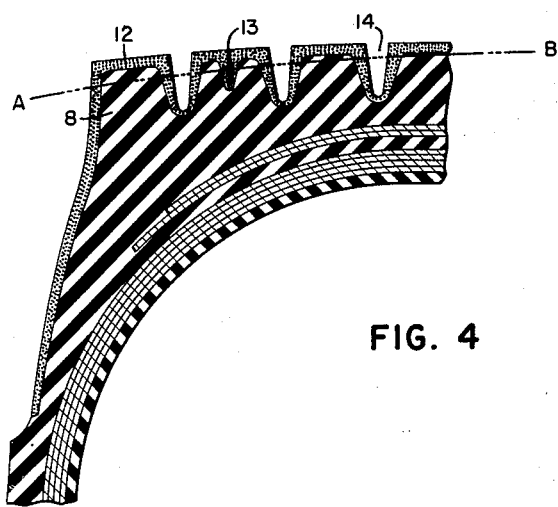
FIGURE 4 is a radial section of the same tire after the tread has been cured.

The tire may be a new tire or a retreaded tire. In either event the extruded tread stock 8 is uncured. The two ends 9 and 10 of this extruded stock are brought together and covered with the splice 6. The tire is then subjected to pressure in a mold where the tread stock is cured. If this stock is retread stock, a retreading mold is used; if it is a tread stock for a new tire, a new tire mold is used. Some of the splice material may be forced between the ends of the extruded tread, but this is not necessary. Most of the splice strip is simply pressed into the surface of the uncured rubber stock in the mold and forms a surface splice as shown in FIGURE 4. The short lengths of filamentary material keep the two portions of the tire together before curing, and prevent their separation when the cured tire is put into service.

Figure 1:
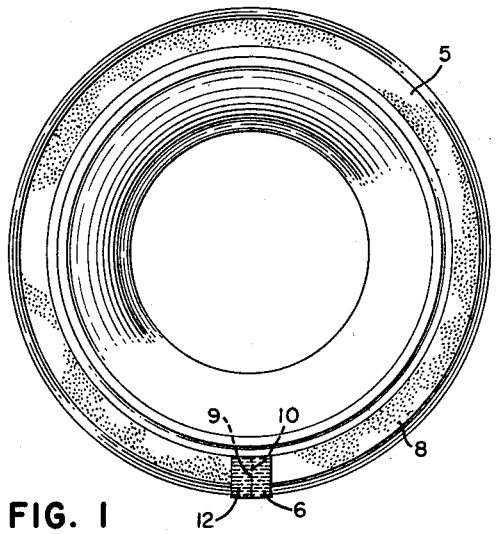
FIGURE 1 is an elevation of a new or retreaded tire showing how the ends of the tread are spliced together.
Figure 3:
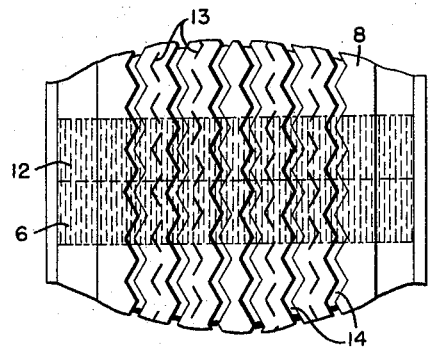
FIGURE 3 is a further enlarged top view of the splice of FIGURE 1, showing filamentary material arranged across the splice.
Figure 2:
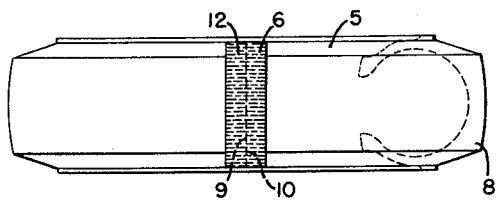
FIGURE 2 is an enlarged top view of the splice shown in FIGURE 1.

The nylon 12 is preferably aligned circumferentially of the tire as best illustrated in FIGURES 3 and 4. Pieces of filamentary material adjacent the sipes 13 and grooves 14 will be drawn into the rubber.

The filamentary material is aligned in the stock when it is extruded or calendered; so to align it circumferentially, the splice is merely cut from the end of an extruded or calendered strip. It is not necessary that the filamentary material be aligned circumferentially. It may be aligned on the bias. It may be dispersed at random without any particular alignment, as by sprinkling the filamentary material between two thin plies of the splice stock, and then pressing the two plies together. Splices containing filamentary material aligned across them, in the direction perpendicular to the alignment have the same elongation as the rubber and withstand squirming and flat-spotting without cracking loose at the edges.

Figure 5:
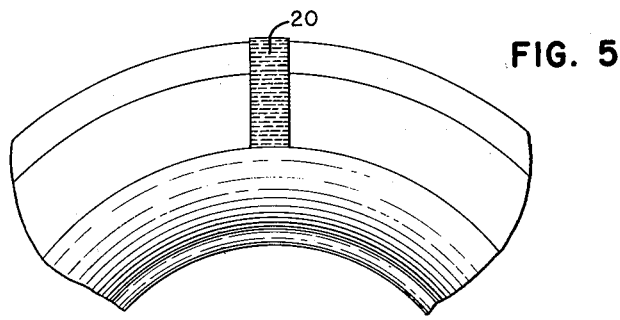
FIGURE 5 is an elevation of a spliced section of an earthmover tire before curing.
Figure 6:
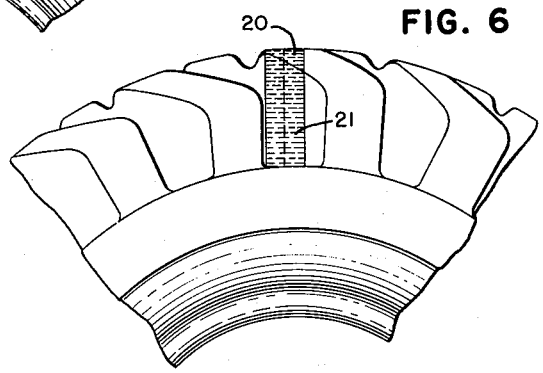
FIGURE 6 is a similar view of the same after curing.
Figure 10:
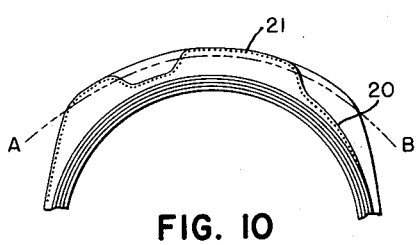
FIGURE 10 is a radial section of the spliced tire of FIGURES 5 and 6.

FIGURES 5 and 6 are different views of a spliced earth-mover tire, illustrating how the invention may be applied to such a tire. FIGURE 5 is a view of the tire before curing, and FIGURE 6 after curing. When subjected to inflating pressure in the curing mold, the splice strip 20 is pressed into the surface of the uncured rubber stock. It follows the contour of the tread irregularities. FIGURE 10 illustrates diagrammatically, but clearly, how the splice 20 follows the tread configurations of the finished tire, whether a new tire or a retread. It shows the filamentary material 21 aligned circumferentially in the splice 20.

Figure 7:
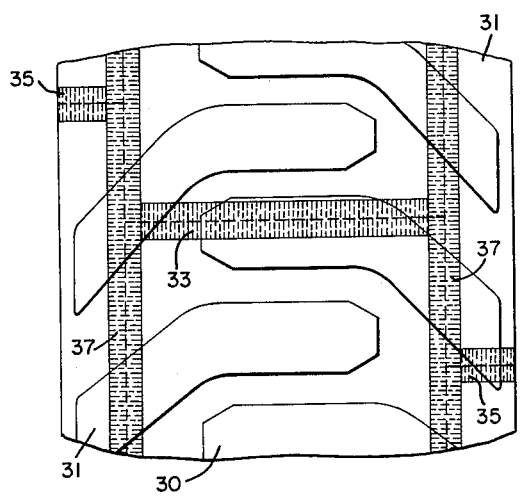
FIGURE 7 is a plan view of an earthmover tire showing (1) the ends of the tread spliced together, (2) the ends of the side pieces spliced together, and (3) the tread spliced circumferentially to the side pieces.

The cured earthmover tire of FIGURE 7 is contructed of a tread center 30 and side pieces 31, all placed over the fabric carcass. The splice 33 holds the ends of the extruded tread stock together. The splices 35 hold the ends of the respective side pieces together. The circumferential splices 37 hold the tread center and side pieces together. In the splices 33 and 35 the filamentary material is advantageously aligned circumferentially so that it lies perpendicularly to the interfaces between the ends of the tread and between the ends of the respective side pieces. In the splices 37, the filamentary material is preferably aligned cross-wise of the splice perpendicular to the interface between the tread center and one of the side pieces. It is positioned radially, i.e. crosswise of the tire.

Figure 8:
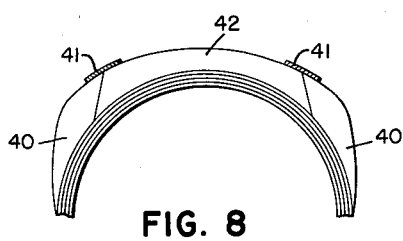
FIGURES 8 and 9 are radial sections of tires assembled from different lay-ups, showing different locations of the circumferential splices in the two different lay-ups.
Figure 9:
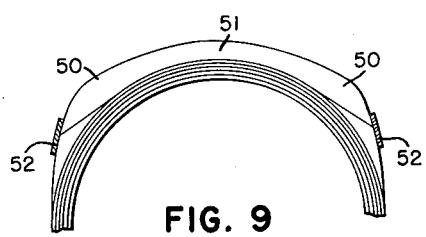

FIGURES 8 and 9 illustrate quite diagrammatically the locations of circumferential splices in different methods of laying up the rubber portions of a new tire on the fabric carcass. In FIGURE 8 the side pieces 40 include the shoulders of the tire so that the circumferential splices 41 that join these to the tread 42 are impressed into the outer surface of the tire. In FIGURE 9, the shoulders 50 are unitary with the tread 51, so that the splices 52 are impressed into the walls of the tire.

After a tire has been put into service and the tread is worn to the wear line A–B shown in FIGURES 4 and 10, the splice still holds the different portions of the tire together, as there illustrated.

It is clear from the foregoing, that the splices can be applied externally to bond any two rubber portions of the tire together. It is possible to place the splices on the carcass before applying the rubber, but the splices are preferably applied externally to cover the areas where cracks would develop at the interfaces between the rubber pieces were the splices not present.

Although described more particularly with respect to splicing different rubber portions of a pneumatic tire, it is applicable as well to the splicing of the ends of solid tires and other articles such as belts, etc.

The invention is covered in the claims which follow.

I claim:

1. A structure which comprises at its surface two portions of uncured rubber touching one another at their edges, and bonded together at said surface by rubber reinforced with discrete, discontinuous lengths of filamentary material dispersed therein, each being substantially ¼ to 1¼ inches in length, with a major portion of the filamentary material at said edges extending across at least one of said edges, at said surface, said reinforced rubber being impressed in the rubber portions on both sides of said edge.

2. A cured pneumatic tire which comprises at its surface two portions of rubber with the edge of one portion touching the other portion at said surface, and rubber reinforced with lengths of filamentary material substantially ¼ to 1¼ inches in length holding the two portions together, said lengths being separately embedded in the rubber, the reinforced rubber being impressed in the rubber portions over said edge so that the outer surface of said reinforced rubber is in the plane of the adjacent outer surfaces of the rubber portions, at least a major portion of the filamentary material at said edge extending across the edge.

3. The tire of claim 2 in which the lengths of textile filamentary material over the interface between the two rubber portions are generally aligned to bridge the interface between the two rubber portions perpendicularly.

4. The tire of claim 2 in which the two rubber portions are the ends of an extruded rubber tread.

5. The tire of claim 4 which is a retreaded tire.

6. The tire of claim 2 in which the two rubber portions are the ends of a side piece.

7. The tire of claim 2 in which the two rubber portions are a tread center and a side piece.

8. A cured pneumatic tire which comprises a tread center and an annular side portion at each side of the tread center, and five splices impressed in the surface of the tire and vulcanized thereto, each splice being composed of rubber and lengths of textile filamentary material substantially ¼ to 1¼ inches in length, each splice being impressed in the tire with its outer surface in the same plane as the adjoining tire surfaces, one splice joining the ends of the tread center, one splice joining the ends of each side piece, and the other two splices being circumferential and joining a side piece to the tread center, the lengths of filamentary material bridging the interfaces between the rubber portions joined by the respective splices being generally aligned perpendicularly to the respective interfaces.

9. The tire of claim 2 after use, in which the tire is a used tire with depressions in the tread, which tire has been used and possesses a worn tread, and the reinforcement is at the tread, part of the reinforcement having been worn away but with reinforcement remaining over the interface between two rubber portions in said depressions.

10. The method of forming a product from at least two adjoining pieces of rubber which comprises applying a splice strip across the interface between the two pieces onto their surfaces before curing, the splice strip comprising lengths of filamentary material substantially ¼ to 1¼ inches long separately embedded in rubber reinforcement, and then curing and impressing the reinforcement into the rubber surfaces until its outer surface is in the same plane as the adjoining surfaces of the rubber pieces.

11. The method of manufacturing a tire by splicing two rubber portions of the surface thereof together, which method comprises holding said rubber portions together during the cure while the tire is inflated in a mold by a splice and impressing the splice into the portions, the splice being composed of rubber reinforced with lengths of filamentary material each substantially ¼ to 1¼ inches long.

12. The method of curing a strip of tread stock on to a tire carcass to form the tread thereof, while the tire is inflated and the strip is therefore under tension, which method comprises holding the ends of the strip together during the cure while the tire is inflated in a mold by a splice and impressing the splice into the strip, the splice being composed of rubber reinforced with lengths of filamentary material each substantially ¼ to 1¼ inches long.

References Cited in the file of this patent

UNITED STATES PATENTS

| 2,339,559 | Charnes | Jan. 18, 1944 |
| 2,342,195 | Heintz | Feb. 22, 1944 |
| 2,411,659 | Manning | Nov. 26, 1946 |
| 3,018,814 | Saint-Paul | Jan. 30, 1962 |

FOREIGN PATENTS

| 6,866 | Great Britain | of 1910 |
| 311,056 | Great Britain | May 9, 1929 |
| 336,076 | Great Britain | Oct. 9, 1930 |
| 707,040 | Great Britain | Apr. 7, 1954 |